(12) United States Patent
Xu

(10) Patent No.: US 12,290,918 B2
(45) Date of Patent: May 6, 2025

(54) RUBBER PART STRUCTURE FOR VACUUM SUCTION PAD AND VACUUM SUCTION PAD WITH REPLACEABLE RUBBER PART

(71) Applicant: ZHEJIANG SHIJING TOOLS CO., LTD., Wuyi (CN)

(72) Inventor: Min Xu, Yongkang (CN)

(73) Assignee: ZHEJIANG SHIJING TOOLS CO., LTD., Wuyi (CN)

( * ) Notice: Subject to any disclaimer, the term of this patent is extended or adjusted under 35 U.S.C. 154(b) by 0 days.

(21) Appl. No.: 18/914,151

(22) Filed: Oct. 12, 2024

(65) Prior Publication Data

US 2025/0033228 A1    Jan. 30, 2025

(30) Foreign Application Priority Data

Mar. 6, 2024    (CN) .......................... 202420434673.7

(51) Int. Cl.
  *B25J 15/00*    (2006.01)
  *B25J 15/06*    (2006.01)

(52) U.S. Cl.
  CPC ................................ *B25J 15/0683* (2013.01)

(58) Field of Classification Search
  CPC ........ B25J 15/0683; B25J 15/10; B25J 15/12; B25J 15/0616
  USPC ......................................... 294/183, 188, 189
  See application file for complete search history.

(56) References Cited

U.S. PATENT DOCUMENTS

| | | | | |
|---|---|---|---|---|
| 2,815,240 A * | 12/1957 | Lytle | ..................... | B66C 1/0212 294/189 |
| 3,005,652 A * | 10/1961 | Helm | ..................... | B66C 1/0231 294/189 |
| 3,152,828 A * | 10/1964 | Lytle | ..................... | B65G 47/91 294/189 |
| 3,833,230 A * | 9/1974 | Noll | ..................... | B23Q 7/043 269/21 |
| 5,029,383 A * | 7/1991 | Snyder | ............... | H05K 13/0409 294/183 |
| 5,190,322 A * | 3/1993 | Hughes | ............ | F02M 35/10144 285/332 |
| 6,527,323 B2 * | 3/2003 | Nagai | .................. | B25J 15/0616 294/189 |
| 6,808,216 B2 * | 10/2004 | Hayes | .................... | B65G 47/91 901/40 |
| 8,011,706 B2 * | 9/2011 | Schmidt | ................. | B65G 47/90 294/61 |
| 11,400,604 B2 * | 8/2022 | Milhau | ............... | B25J 15/0683 |
| 11,554,505 B2 * | 1/2023 | Anderson | ............ | B25J 15/0683 |
| D1,050,663 S * | 11/2024 | Xu | .................. | D34/28 |
| 2018/0286772 A1 | 10/2018 | Yamamoto et al. | | |

(Continued)

*Primary Examiner* — Paul T Chin
(74) *Attorney, Agent, or Firm* — Hemisphere Law, PLLC; Zhigang Ma

(57) ABSTRACT

A rubber part structure for the vacuum suction pad includes a rubber part (1); an air hole (2) for air extraction and discharging is provided in the middle of the rubber part (1); a ringlike lip edge (3) is arranged around the rubber part (1); an air extraction chamber (4) communicated to the air hole (2) is formed on an inner side of the lip edge (3); and the flanging (5) is configured to be in buckled connection with the vacuum suction pad from the outside of the vacuum suction pad. The present disclosure has the characteristics of low replacement cost in a rubber part and high structural strength in a framework.

10 Claims, 11 Drawing Sheets

(56) References Cited

U.S. PATENT DOCUMENTS

2023/0271335 A1    8/2023   Cho
2023/0271336 A1    8/2023   Xu et al.

\* cited by examiner

RUBBER PART STRUCTURE FOR VACUUM SUCTION PAD AND VACUUM SUCTION PAD WITH REPLACEABLE RUBBER PART

TECHNICAL FIELD

The present disclosure relates to a vacuum shuck, and in particular, to a rubber part structure for a vacuum suction pad and a vacuum suction pad with a replaceable rubber part.

BACKGROUND

A vacuum suction pad is mainly composed of a framework, a handle, and an air pump. A cavity for vacuuming is formed in a bottom of the framework. An inner side of the cavity is communicated to the air pump through an air extraction and discharging channel. During use, the vacuum suction pad is manually placed on an object, and the cavity is made to completely fit a surface of the object. Then, the air pump is turned on to extract air from the cavity region, so that the framework and the object are fixed to each other in a negative pressure state, facilitating movement of a worker. After the object is moved in place, the air pump is turned off, and the negative pressure in the cavity is released, thereby eliminating the connection force between the vacuum suction pad and the object. Based on this, to ensure the airtightness of the cavity region during vacuumizing, the manufacturer will further mount a rubber part on the framework around the cavity, namely, the rubber part is used to be in contact with the surface of the object to achieve sealing, thereby avoiding the problem of air leakage caused by a gap in a connection.

However, the existing vacuum suction pad has the defects below. To prevent detachment of the rubber part, the rubber part and framework of the vacuum suction pad are generally fixed, so that they cannot be separated from each other. This causes poor airtightness because of wear and a notch of the rubber part after long-term use, and the rubber part and the framework need to be replaced as a whole, thereby increasing the maintenance and replacement costs of the vacuum suction pad.

Secondly, to achieve the formation of the cavity in the bottom of the framework, a ringlike shell structure will be formed around the cavity region of the framework. This structure will cause a decrease in the structural strength of the framework at the cavity, leading to the problems such as compression deformation and cracking during subsequent transportation, storage, and use, or leading to poor airtightness of the rubber part after the deformation of the framework. Thus, on the one hand, the stability and service life of the vacuum suction pad are reduced, and on the other hand, the vacuum suction pad cannot bear a high load and has poor applicability.

Therefore, the existing vacuum suction pad has the problems of high replacement cost in the rubber part and low structural strength in the framework.

SUMMARY

The present disclosure aims to provide a rubber part structure for a vacuum suction pad and a vacuum suction pad with the replaceable rubber part. The vacuum suction pad has the characteristics of low replacement cost in a rubber part and high structural strength in a framework.

According to the technical solution of the present disclosure: A rubber part structure for a vacuum suction pad includes a rubber part. An air hole for air extraction and discharging is provided in the middle of the rubber part; a ringlike lip edge is arranged around the rubber part; an air extraction chamber communicated to the air hole is formed on an inner side of the lip edge; a ringlike flanging is arranged on the rubber part on an outer side of the lip edge; and the flanging is configured to be in buckled connection with the vacuum suction pad from the outside of the vacuum suction pad.

In the rubber part structure for the vacuum suction pad described above, a ringlike deformation slot is provided in the middle of the lip edge, and the lip edge below the deformation slot forms a bent portion configured to abut against a surface of an object by deformation after the vacuum suction pad extracts air.

In the rubber part structure for the vacuum suction pad described above, a buffer element is connected into the deformation slot, and hardness of the buffer element is less than hardness of the lip edge.

In the rubber part structure for the vacuum suction pad described above, a handle for air discharging is arranged on the outer side of the lip edge.

In the rubber part structure for the vacuum suction pad described above, a material of the rubber part is rubber.

A vacuum suction pad with a replaceable rubber part is provided. The vacuum suction pad includes the above rubber part structure for the vacuum suction pad.

In the vacuum suction pad with the replaceable rubber part described above, the vacuum suction pad includes a framework; a grip is arranged at a top of the framework; a mounting surface is formed at a bottom of the framework; a periphery of the mounting surface is connected to the rubber part through a buckling element; an upper end of the rubber part is wrapped around the buckling element via the flanging and is buckled with the buckling element; and a lower end of the rubber part extends to a position below the mounting surface via the lip edge and forms the air extraction chamber.

In the vacuum suction pad with the replaceable rubber part described above, the buckling element includes a buckling plate arranged at a peripheral edge of the framework; an overlap edge is arranged on the framework on an inner side of the buckling plate; the middle of the flanging is in buckling connection to the buckling plate through a buckling slot; and an inner side of the flanging extends to an inner end of the buckling plate and abuts against an outer wall of the overlap edge.

In the vacuum suction pad with the replaceable rubber part described above, a conical surface with a narrow top and a wide bottom is formed at a position where the overlap edge abuts against the flanging.

In the vacuum suction pad with the replaceable rubber part described above, an inner side of the grip is detachably connected with an air pump through a mounting hole; an air extraction and discharging channel is provided in the grip on one side of the mounting hole; one end of the air extraction and discharging channel is communicated to the air pump; and the other end of the air extraction and discharging channel is communicated to the air extraction chamber after passing through the framework and the air hole in sequence.

In the vacuum suction pad with the replaceable rubber part described above, the air hole is provided in a center of the rubber part; a first air passing slot is provided in the mounting surface; a top of the first air passing slot is communicated to the air extraction and discharging channel; one end of the first air passing slot extends to an inner side of the air hole and is communicated to the air extraction chamber; and the other end of the first air passing slot extends to a position above the rubber part on an outer side of the air hole.

In the vacuum suction pad with the replaceable rubber part described above, a dust cover located on an inner side of the rubber part is in buckling connection into the first air passing slot; and after being extracted, air in the air extraction chamber passes through the dust cover and enters the air extraction and discharging channel.

In the vacuum suction pad with the replaceable rubber part described above, a connection port configured to mount a negative pressure gauge is provided in a top surface of the framework; a second air passing slot is provided in a bottom surface of the framework; one end of the second air passing slot extends inwards into an inner hole of the rubber part; and the other end of the second air passing slot is communicated to the connection port.

In the vacuum suction pad with the replaceable rubber part described above, an exterior of the air pump is connected to the mounting hole through a positioning ring; the positioning ring is configured to achieve concentric positioning on the mounting hole and the air pump; and a sealing ring is connected between the positioning ring and the mounting hole.

In the vacuum suction pad with the replaceable rubber part described above, the mounting surface sis circular or elliptical.

In the vacuum suction pad with the replaceable rubber part described above, the grip includes a crossbeam; vertical beams connected to the framework are arranged at two ends of the crossbeam; the mounting hole is provided in one end of the crossbeam; one end of the air pump provided with the air hole is inserted into the mounting hole; one end of the air extraction and discharging channel is located on a bottom surface of the mounting hole; and the other end of the air extraction and discharging channel is communicated to the inner hole of the rubber part after passing through one of the vertical beams.

Compared with the prior art, the present disclosure has the following characteristics:

(1) According to the present disclosure, since the structure of the rubber part is limited, the rubber part can be in buckling connection outside the vacuum suction pad during mounting. Therefore, when the rubber part is damaged and needs to be replaced, a user can directly peel it off from the vacuum suction pad and replace it, without replacing the framework of the suction pad, which effectively reduces the replacement cost of the rubber part.

(2) Based on this, by limiting the structure of the lip edge, the independent air extraction chamber can be formed on the inner side of the rubber part, so that the vacuum suction pad can achieve mounting and vacuumizing functions on the rubber part only through a planar structure. This effectively improves the structural strength of the framework of the suction pad, reduces the possibility of deformation of the framework under force, and enables the vacuum suction pad to bear a larger load. When the mounting surface of the vacuum suction pad forms the planar structure, the structural stability of the rubber part and abutting effect on the rubber part and the mounting surface can be improved, thereby reducing the possibility of deformation of or a gap in the rubber part due to improper mounting during subsequent replacement and use.

(3) By structural cooperation between the deformation slot and the bent portion, the bent portion can form a bend and be closely clung to the surface of the object during pressing. Meanwhile, the bent portion can undergo local deformation with fluctuation of the surface of the object or under the suction force, thereby effectively improving the abutment tightness between the bent portion and the object and reducing the possibility of occurrence of a gap between the rubber part and the object. By the arrangement of the buffer element, the lip edges on upper and lower sides of the deformation slot can be separated from each other, thereby preventing a failure of a deformation effect caused by bonding of the two lip edges during use. Moreover, since the hardness of the buffer element is lower than that of the lip edge, the bent portion can overcome the elastic force of the buffer element and bend inwards during use, to ensure the deformation and suction effect of the bent portion.

(4) Based on the above, the present disclosure limits the connection structure between the vacuum suction pad and the rubber part. The rubber part can be wrapped around the buckling element during mounting, and the tightness of connection between the vacuum suction pad and the rubber part can be improved by the cooperation between the buckling plate and the overlap edge, thereby reducing the possibility of occurrence of a gap between the rubber part and the vacuum suction pad or separation and releasing.

(5) By the structural cooperation of the air extraction and discharging channel, the first air passing slot, and the air hole, communication between the air extraction chamber and the air pump can be ensured when the rubber part is rotated to any circumferential position outside the framework, thereby effectively enhancing the use effect of the present disclosure after the rubber part is replaced and reducing the difficulty in replacing the rubber part for a user.

Therefore, the present disclosure has the characteristics of low replacement cost in a rubber part and high structural strength in a framework.

NUMERALS IN THE ACCOMPANYING DRAWINGS

1: rubber part; 2: air hole; 3: lip edge; 4: air extraction chamber; 5: flanging; 6: deformation slot; 7: bent portion; 8: buffer element; 9: framework; 10: grip; 11: mounting surface; 12: buckling plate; 13: overlap edge; 14: mounting hole; 15: air pump; 16: air extraction and discharging channel; 17: first air passing slot; 18: dust cover; 19: positioning ring; 20: negative pressure gauge; 21: second air passing slot; and 131: conical surface.

DETAILED DESCRIPTION OF THE EMBODIMENTS

The present disclosure will be further explained below in conjunction with the accompanying drawings and embodiments, but the following will not be used as a basis for limiting the present disclosure.

Figure 1:
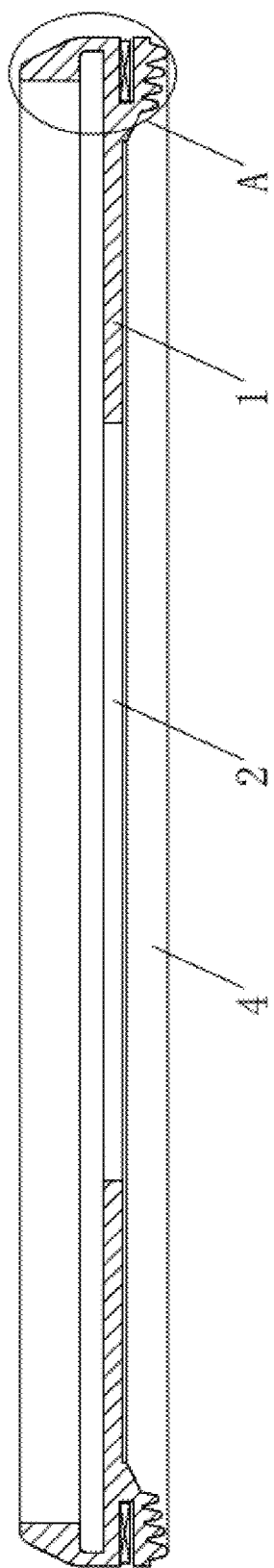
FIG. 1 is a schematic structural diagram of a rubber part structure in Embodiment 1.
Figure 2:
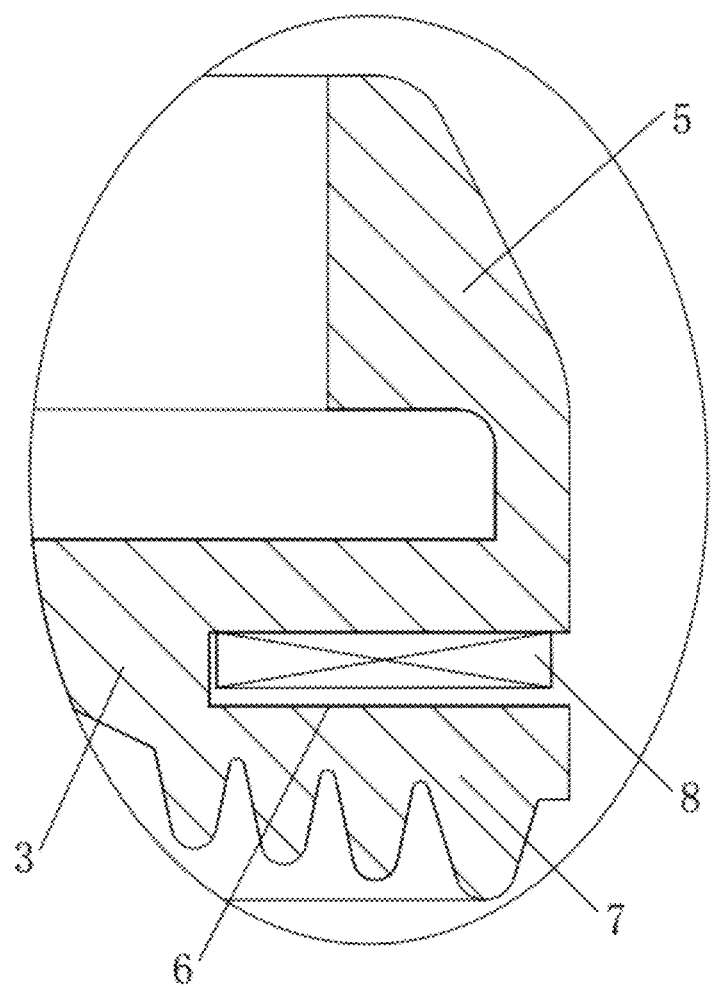
FIG. 2 is an enlarged view in direction A of FIG. 1.
Figure 3:
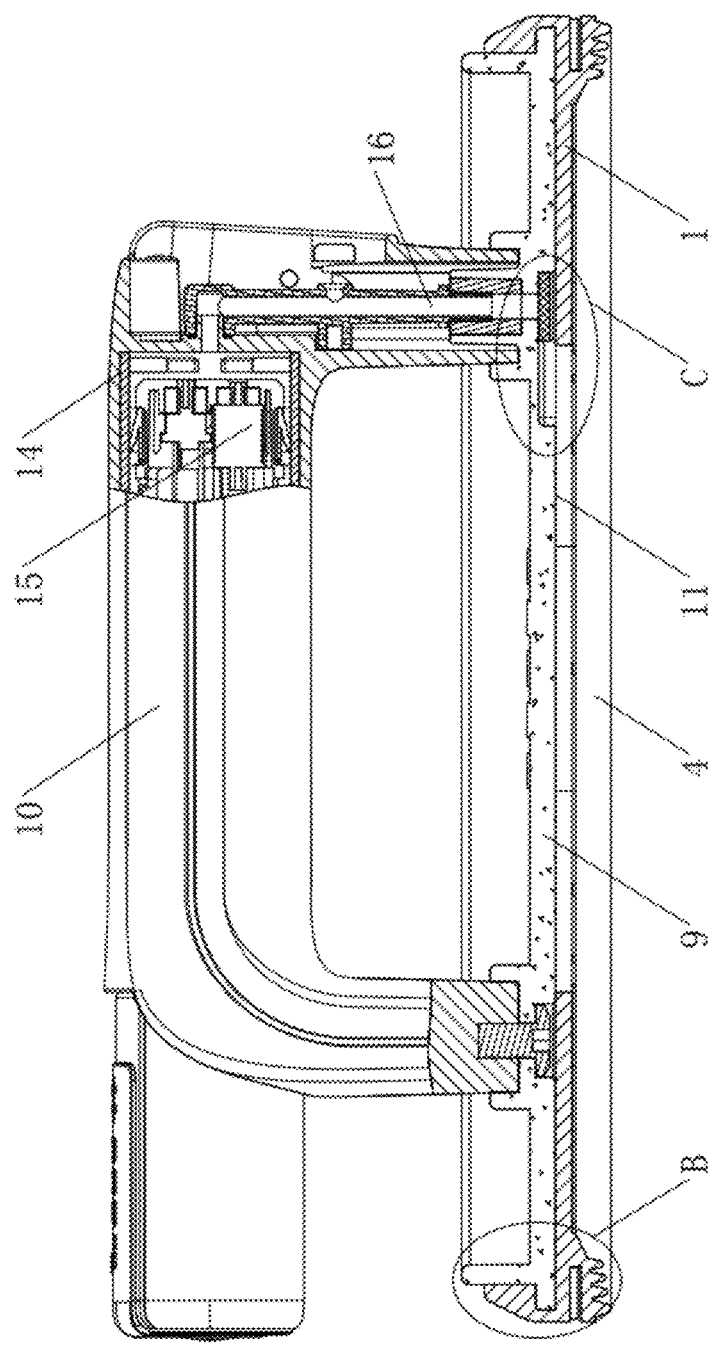
FIG. 3 is a schematic structural diagram of a vacuum suction pad in Embodiment 1.
Figure 4:
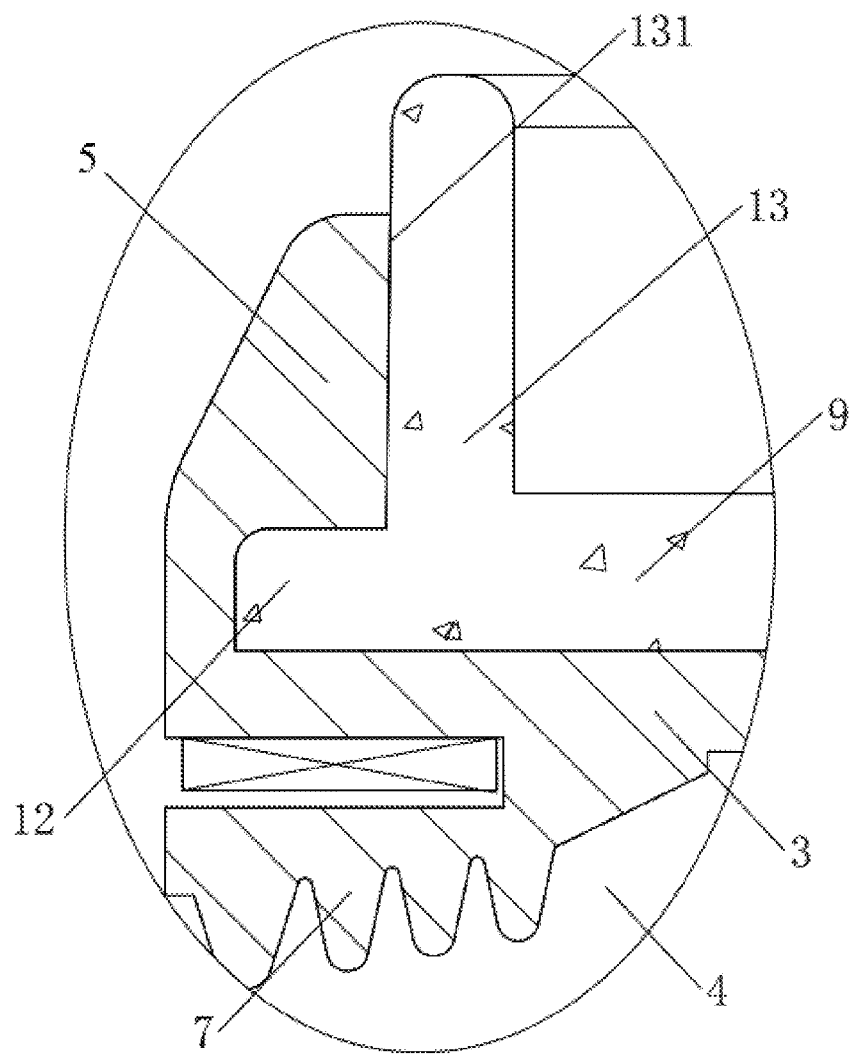
FIG. 4 is an enlarged view in direction B of FIG. 3.
Figure 5:
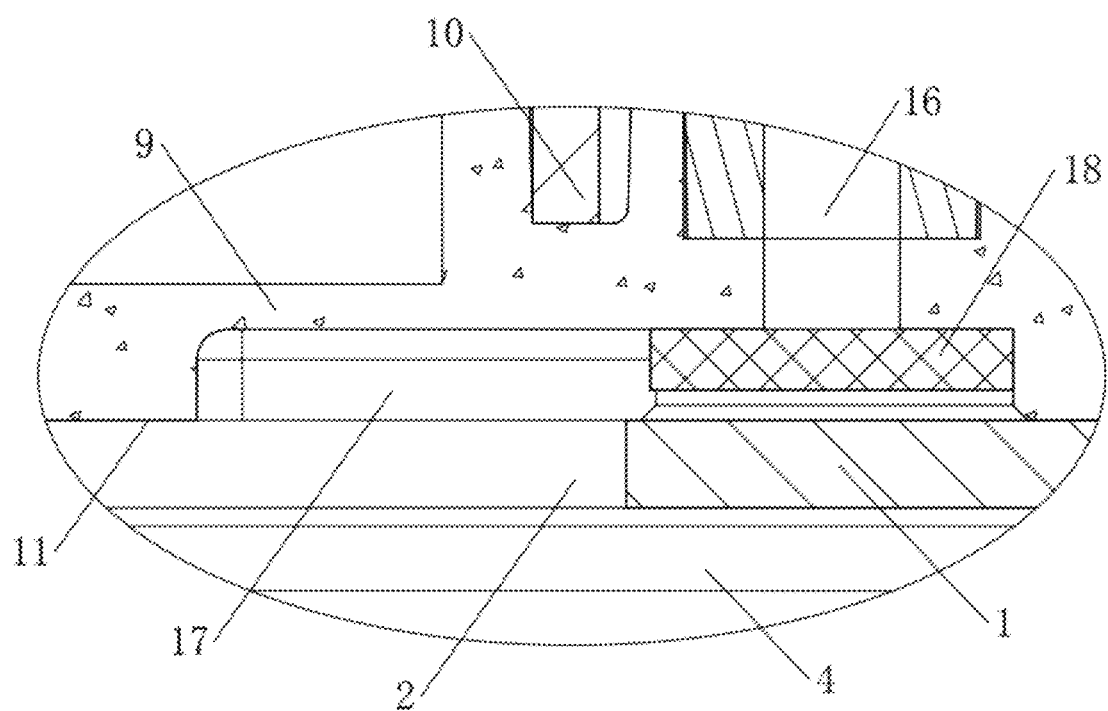
FIG. 5 is an enlarged view in direction C of FIG. 3.
Figure 6:
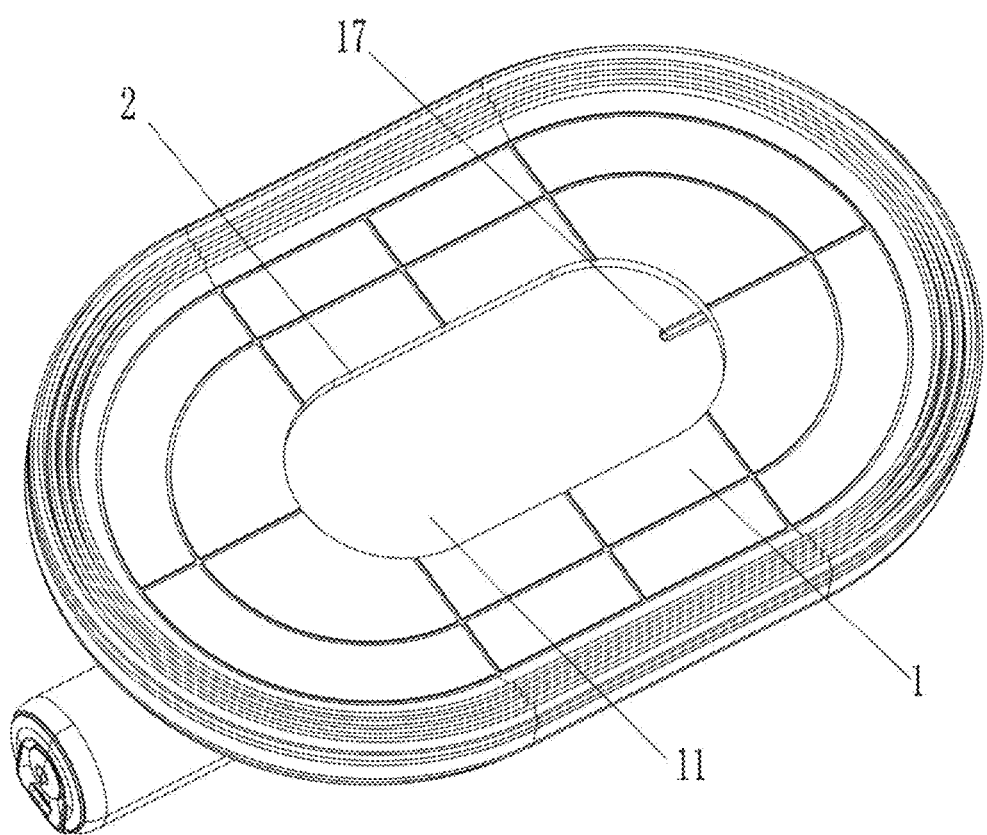
FIG. 6 is an outside view of a mounting surface of the vacuum suction pad of Embodiment 1.
Figure 7:
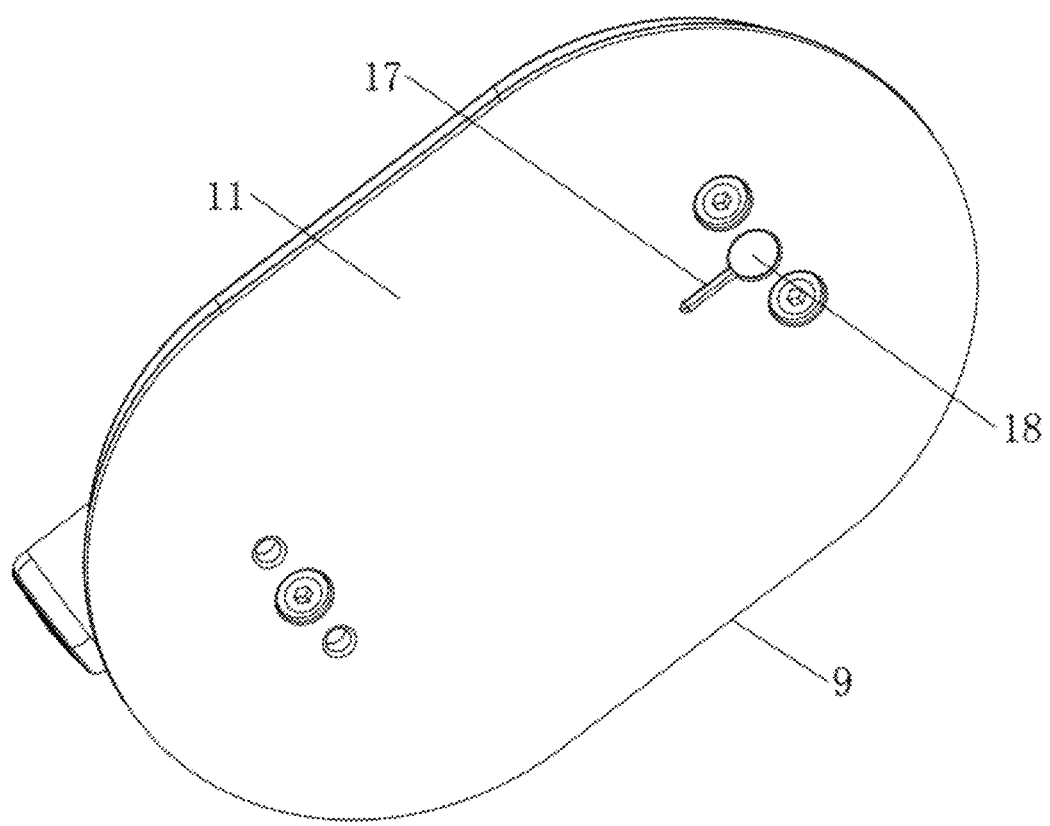
FIG. 7 is an outside view of FIG. 6 after removing the rubber part.

Embodiment 1 A rubber part structure for a vacuum suction pad, the constitution of which is as shown in FIG. 1 to FIG. 2, includes an elliptical rubber part 1. An air hole 2 for air extraction and discharging is provided in the middle of the rubber part 1. A ringlike lip edge 3 is arranged around the rubber part 1. An air extraction chamber 4 communicated to the air hole 2 is formed on an inner side of the lip edge 3. A ringlike flanging 5 is arranged on the rubber part 1 on an outer side of the lip edge 3. The flanging 5 is configured to be in buckled connection with the vacuum suction pad from the outside of the vacuum suction pad. The rubber part 1, the lip edge 3, and the flanging 5 are made of natural rubber and butadiene rubber and are integrally formed. The rubber part 1 has tensile strength greater than 14 Mpa, shore hardness of 50 to 70, and rubber content of 45% or above.

Two or more sealing strips are arranged around a bottom of the lip edge 3 side by side in a radial direction. Adjacent sealing strips are separated from each other, so that the sealing strips are used to enhance the abutment effect on a surface of an object.

A ringlike deformation slot 6 is provided in the middle of the lip edge 3. The deformation slot 6 is U-shaped, and one end of the deformation sot is communicated to the outside. The lip edge 3 below the deformation slot 6 forms a bent portion 7 configured to abut against a surface of an object by overall bending and/or local deformation after the vacuum suction pad extracts air. The sealing strips are distributed around a bottom of the bent portion 7.

A buffer element 8 is connected into the deformation slot 6. The buffer element 8 is made of a flexible material and has hardness less than that of the lip edge 3.

A handle for air discharging is arranged on the outer side of the lip edge 3.

A vacuum suction pad with a replaceable rubber part for a vacuum suction pad is provided. The vacuum suction pad, the constitution of which is as shown in FIG. 3 to FIG. 7, includes a framework 9. The framework 9 is an elliptical plate. A grip 10 is arranged at a top of the framework 9. The grip 10 and the framework 9 are arranged in a split manner and are connected to each other by a screw. The grip 10 is U-shaped. A mounting surface 11 is formed at a bottom of the framework 9. A periphery of the mounting surface 11 is connected to the rubber part 1 through a buckling element. An upper end of the rubber part 1 is wrapped around the buckling element via the flanging 5 and is buckled with the buckling element. A lower end of the rubber part 1 extends to a position below the mounting surface 11 via the lip edge 3 and forms the air extraction chamber 4 for vacuumizing.

The buckling element includes a buckling plate 12 arranged at a peripheral edge of the framework 9. An overlap edge 13 is arranged on the framework 9 on an inner side of the buckling plate 12. The middle of the flanging 5 is in buckling connection to the buckling plate 12 through a buckling slot. An inner side of the flanging 5 extends to an inner end of the buckling plate 12 and abuts against an outer wall of the overlap edge 13.

A conical surface 131 with a narrow top and a wide bottom is formed at a position where the overlap edge 13 abuts against the flanging 5. An inner wall of the flanging 5 completely abuts against the conical surface 131 after mounting.

An inner side of the grip 10 is detachably connected with an air pump 15 through a mounting hole 14. An air extraction and discharging channel 16 is provided in the grip 10 on one side of the mounting hole 14. One end of the air extraction and discharging channel 16 is communicated to the air pump 15. The other end of the air extraction and discharging channel 16 is communicated to the air extraction chamber 4 after passing through the framework 9 and the air hole 2 in sequence. The mounting hole 14 is of a blind hole structure. One end of the mounting hole 14 away from the air extraction and discharging channel 16 is communicated to the outside and is configured to mount the air pump 15.

The air hole 2 is provided in a center of the rubber part 1. A first air passing slot 17 is provided in the mounting surface 11. Atop of the first air passing slot 17 is communicated to the air extraction and discharging channel 16. One end of the first air passing slot 17 extends to an inner side of the air hole 2 and is communicated to the air extraction chamber 4; and the other end of the first air passing slot 17 extends to a position above the rubber part 1 on an outer side of the air hole 2.

One end of the first air passing slot 17 close to the rubber part 1 is in buckled connection with a dust cover 18 with a ventilation and dustproof function via a round step slot. A thickness of the dust cover 18 is less than a depth of the first air passing slot 17. After being extracted, air in the air extraction chamber 4 passes through the dust cover 18 and enters the air extraction and discharging channel 16. During use, the dust cover 18 can avoid impurities in the air extraction chamber 4 from entering the air extraction and discharging channel 16 to cause blockage. The dust cover 18 is located on an inner side of the rubber part 1 in a height direction, so that the dust cover 18 is limited by cooperation between the first air passing slot 17 and the rubber part 1, to avoid falling of the dust cover 18.

An exterior of the air pump 15 is connected to the mounting hole 14 through a positioning ring 19. The positioning ring 19 is configured to achieve concentric positioning on the mounting hole 14 and the air pump 15. A sealing ring can be arranged between the positioning ring 19 and the mounting hole 14 as needed. The mounting position of the positioning ring 19 and the mounting position of the positioning ring 19 in Embodiment 2 are consistent.

The grip 10 includes a crossbeam. Vertical beams connected to the framework 9 are arranged at two ends of the crossbeam. The vertical beams and the framework 9 are connected by a screw. The mounting hole 14 is provided in one end of the crossbeam. One end of the air pump 15 provided with the air hole is inserted into the mounting hole 14. One end of the air extraction and discharging channel 16 is located on a bottom surface of the mounting hole 14, and after passing through one of the vertical beams, the other end of the air extraction and discharging channel 16 is located on a lower end surface of the vertical beam.

In this embodiment, during use, an operator places the vacuum suction pad on an object through the grip 10, and makes the bent portion 7 at the lower end of the rubber part 1 completely abut against a surface of the object to achieve sealing. After the vacuum suction pad is placed, the operator turns on the air pump 15, and the air pump 15 extracts the air in the air extraction chamber 4 via the air extraction and discharging channel 16, the first air passing slot 17, and the air hole 2, so that a negative pressure environment is formed in the air extraction chamber 4, and the object is sucked onto the vacuum suction pad under the negative pressure, which facilitates the operator to carry the object. According to the vacuum suction pad, in the air extraction process, the bent portion 7 will undergo bending deformation by external pressure or suction force from the air extraction chamber 4, thereby ensuring that the bent portion 7 will be clung to the surface of the object during suction and reducing the possibility of separation or occurrence of a gap between the vacuum suction pad and the object.

After the object is moved in place, the operator turns off the air pump 15, so that the negative pressure in the air extraction chamber 4 disappears, and the object is separated from the vacuum suction pad. If water is accumulated at the abutment positions of the object and the rubber part 1, after the negative pressure disappears, the vacuum suction pad still cannot be removed, the operator can pick up the rubber part 1 from one side through the grip to achieve the separation function.

If the rubber part 1 is damaged after long-time use and needs to be replaced, a user can directly peel the rubber part 1 off from the framework 9, and buckle a rubber part 1 for replacement to the buckling element in the same way after the flanging 5 is opened, so that the rubber part 1 can be separately replaced, and the replacement cost of the rubber part 1 is effectively reduced.

Figure 8:
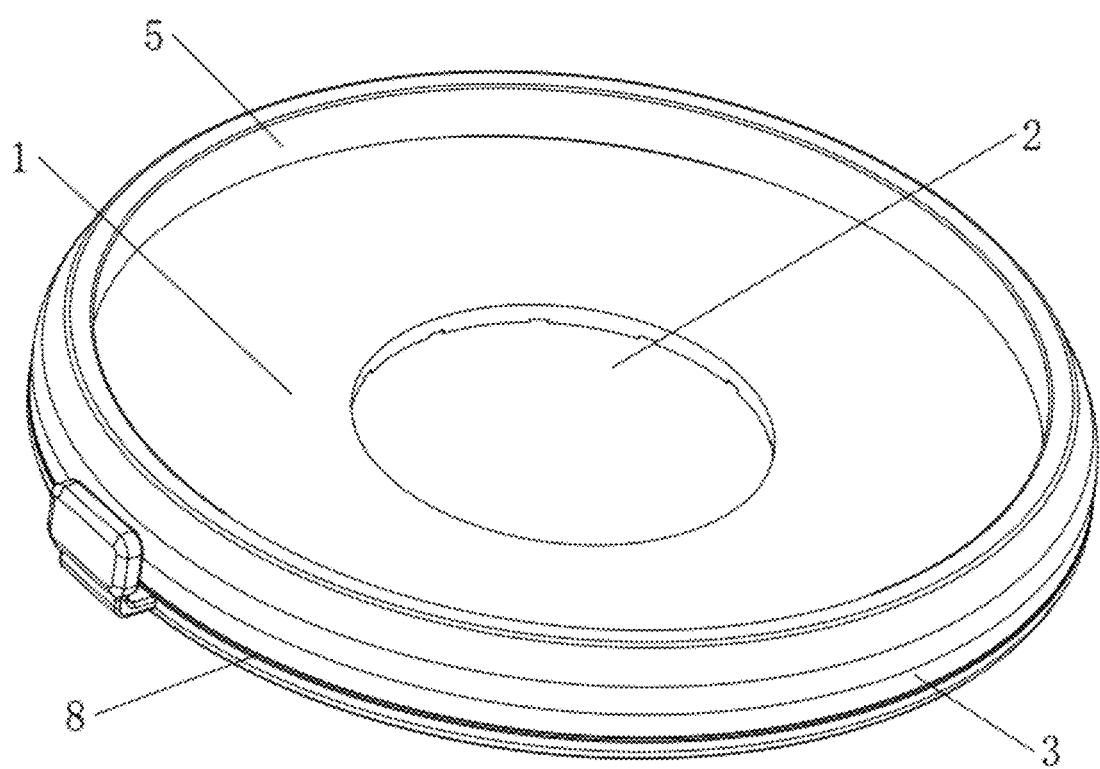
FIG. 8 is a schematic structural diagram of a rubber part structure in Embodiment 2.

Embodiment 2 A rubber part structure for a vacuum suction pad, the constitution of which is as shown in FIG. 8, includes a round rubber part 1. An air hole 2 for air extraction and discharging is provided in the middle of the rubber part 1. A ringlike lip edge 3 is arranged around the rubber part 1. An air extraction chamber 4 communicated to the air hole 2 is formed on an inner side of the lip edge 3. A ringlike flanging 5 is arranged on the rubber part 1 on an outer side of the lip edge 3. The flanging 5 is configured to be in buckled connection with the vacuum suction pad from the outside of the vacuum suction pad. The rubber part 1, the lip edge 3, and the flanging 5 are made of rubber and are integrally formed.

A ringlike deformation slot 6 is provided in the middle of the lip edge 3. The deformation slot 6 is U-shaped, and one end of the deformation sot is communicated to the outside. The lip edge 3 below the deformation slot 6 forms a bent portion 7 configured to abut against a surface of an object by overall bending and/or local deformation after the vacuum suction pad extracts air. The sealing strips are distributed around a bottom of the bent portion 7.

A buffer element 8 is connected into the deformation slot 6. The buffer element 8 is made of a flexible material and has hardness less than that of the lip edge 3.

Two or more sealing strips are arranged around a bottom of the lip edge 3 side by side in a radial direction. Adjacent sealing strips are separated from each other, so that the sealing strips are used to enhance the abutment effect on a surface of an object.

A handle for air discharging is arranged on the outer side of the lip edge 3.

Figure 9:
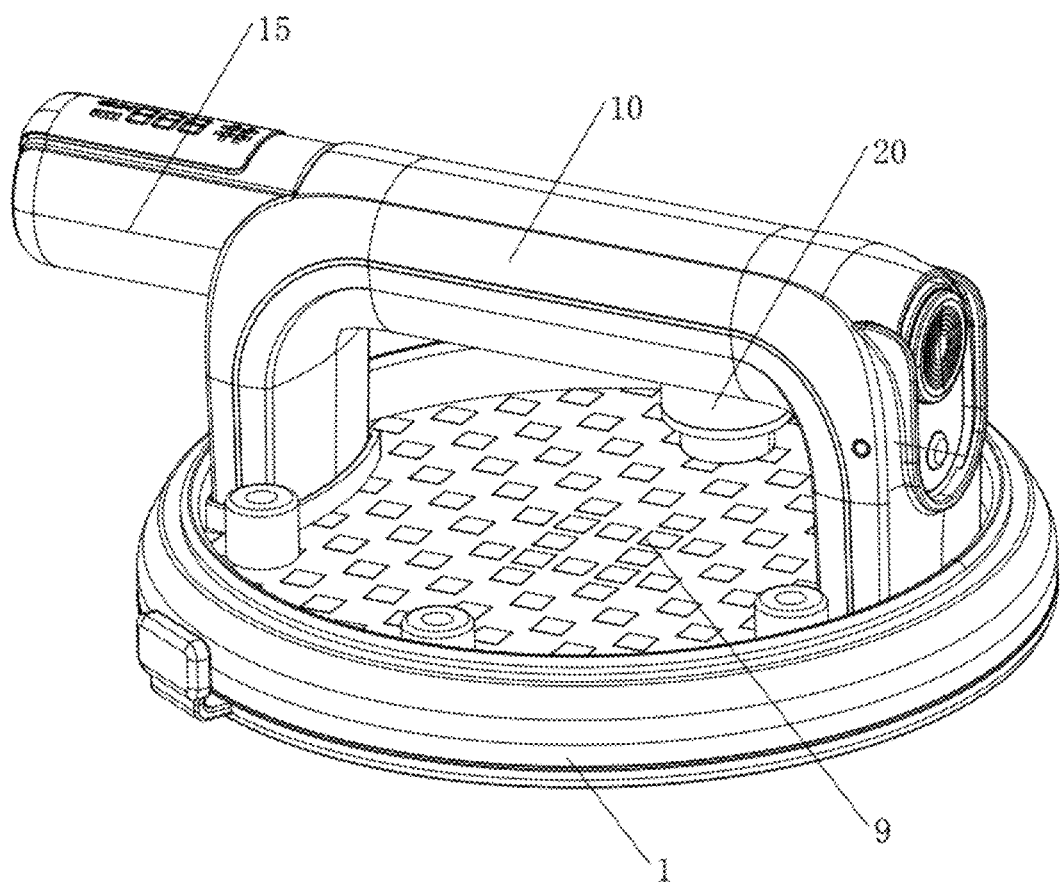
FIG. 9 is an outline view of the vacuum suction pad in Embodiment 2.
Figure 10:
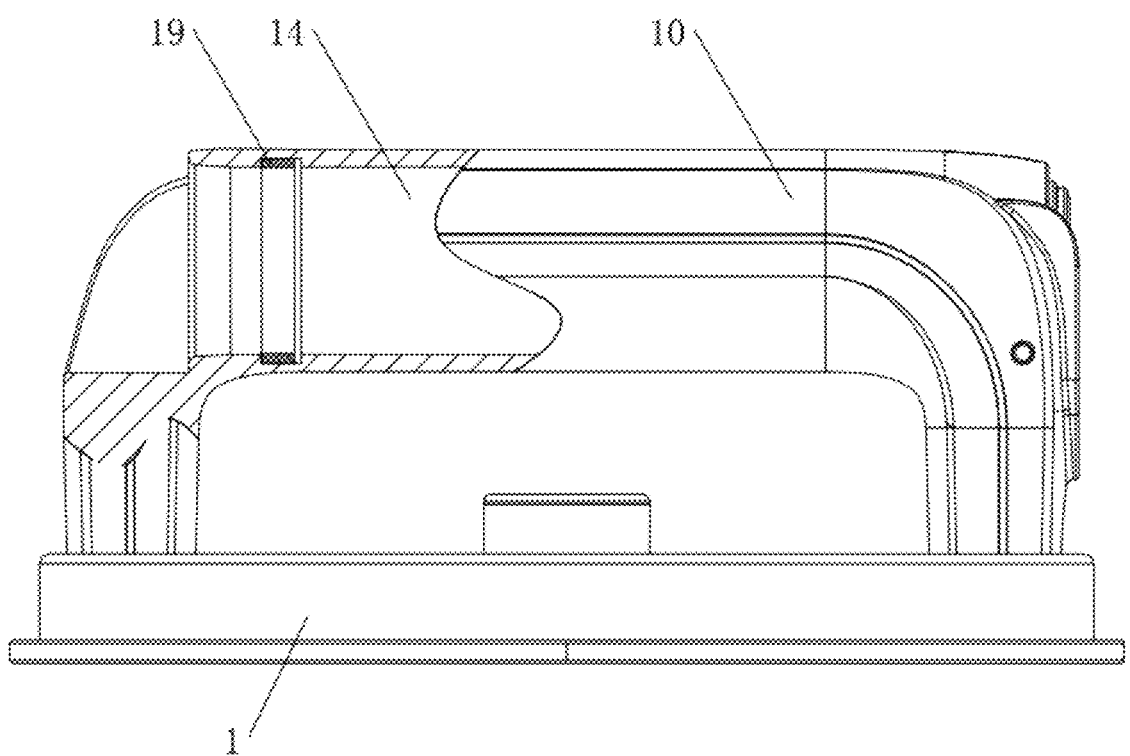
FIG. 10 is a schematic structural diagram of the vacuum suction pad in Embodiment 2 after removing an air pump.
Figure 11:
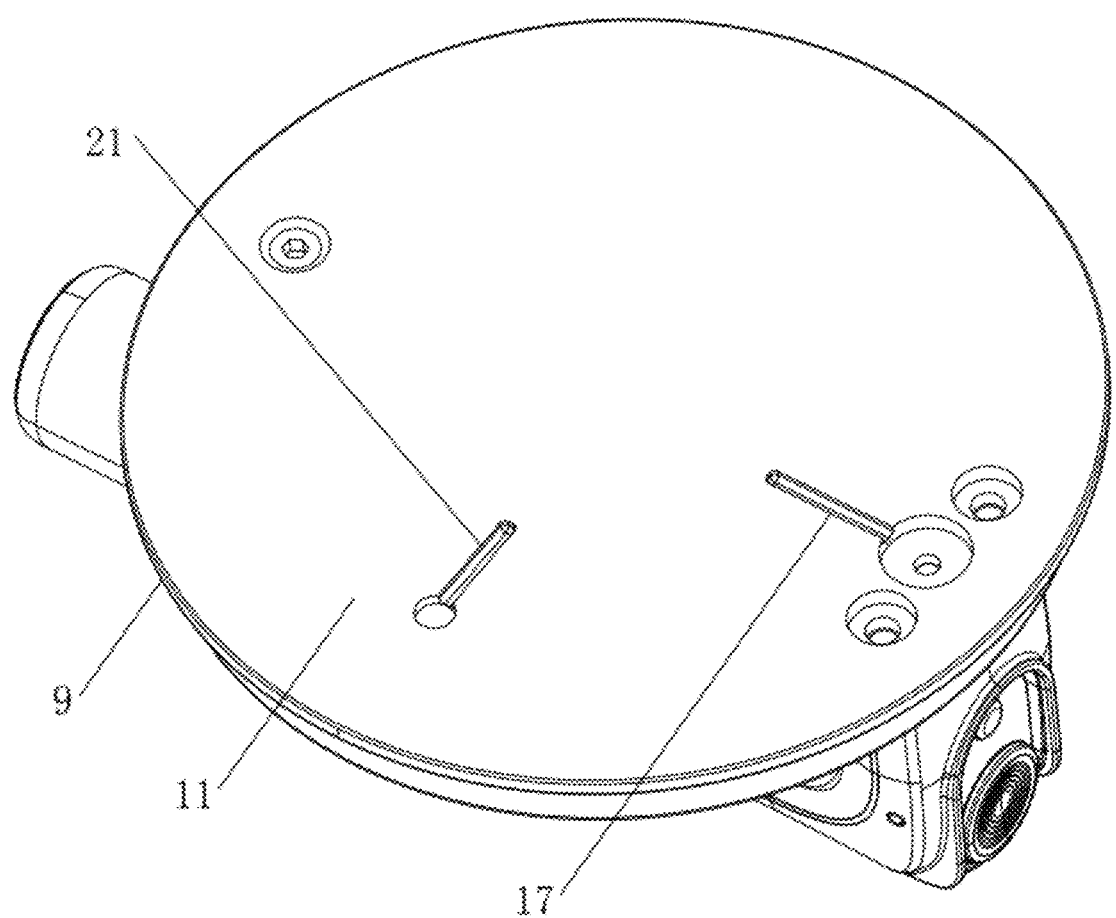
FIG. 11 is an outline view of the vacuum suction pad in Embodiment 2 after removing a rubber part.

A vacuum suction pad with a replaceable rubber part for a vacuum suction pad is further provided, the constitution of which is as shown in FIG. 9 to FIG. 11, includes a framework 9. The framework 9 is a round plate. A grip 10 is arranged at atop of the framework 9. The grip 10 and the framework 9 are arranged in a split manner and are connected to each other by a screw. The grip 10 is U-shaped. Amounting surface 11 is formed at a bottom of the framework 9. A periphery of the mounting surface 11 is connected to the rubber part 1 through a buckling element. An upper end of the rubber part 1 is wrapped around the buckling element via the flanging 5 and is buckled with the buckling element. A lower end of the rubber part 1 extends to a position below the mounting surface 11 via the lip edge 3 and forms the air extraction chamber 4 for vacuumizing.

The buckling element includes a buckling plate 12 arranged at a peripheral edge of the framework 9. An overlap edge 13 is arranged on the framework 9 on an inner side of the buckling plate 12. The middle of the flanging 5 is in buckling connection to the buckling plate 12 through a buckling slot. An inner side of the flanging 5 extends to an inner end of the buckling plate 12 and abuts against an outer wall of the overlap edge 13.

An inner side of the grip 10 is detachably connected with an air pump 15 through a mounting hole 14. An air extraction and discharging channel 16 is provided in the grip 10 on one side of the mounting hole 14. One end of the air extraction and discharging channel 16 is communicated to the air pump 15. The other end of the air extraction and discharging channel 16 is communicated to the air extraction chamber 4 after passing through the framework 9 and the air hole 2 in sequence. The mounting hole 14 is of a blind hole structure. One end of the mounting hole 14 away from the air extraction and discharging channel 16 is communicated to the outside and is configured to mount the air pump 15.

The air hole 2 is provided in a center of the rubber part 1. A first air passing slot 17 is provided in the mounting surface 11. Atop of the first air passing slot 17 is communicated to the air extraction and discharging channel 16. One end of the first air passing slot 17 extends to an inner side of the air hole 2 and is communicated to the air extraction chamber 4; and the other end of the first air passing slot 17 extends to a position above the rubber part 1 on an outer side of the air hole 2.

An exterior of the air pump 15 is connected to the mounting hole 14 through a positioning ring 19. The positioning ring 19 is configured to achieve concentric positioning on the mounting hole 14 and the air pump 15. A sealing ring is connected between the positioning ring 19 and the mounting hole 14.

A connection port is provided in a top surface of the framework 9. A negative pressure gauge 20 is arranged on the connection port. A second air passing slot 21 is provided in the mounting surface 11 at the bottom of the framework 9. The second air passing slot 21 and the first air passing slot 17 are staggered from each other. One end of the second air passing slot 21 extends inwards into an inner hole of the rubber part 1. The other end of the second air passing slot 21 is communicated to the connection port. When the air pump 15 extracts air, a negative pressure value in the air extraction chamber 4 can be displayed through the negative pressure gauge 20, so that a worker intuitively sees whether the vacuum suction pad has been firmly combined with the surface of the object.

Compared with Embodiment 1, this embodiment includes the round rubber part 1 and the round framework 9, which can also achieve stable use of the vacuum suction pad. Based on this, by the cooperation between the second air passing slot 21 and the negative pressure gauge 20, the worker can observe a negative pressure state in the air extraction chamber 4 through the negative pressure gauge 20, thereby enhancing the use effect of the vacuum suction pad.

What is claimed is:

1. A vacuum suction pad with the replaceable rubber part, comprising a rubber part (1), wherein an air hole (2) for air extraction and discharging is provided in the middle of the rubber part (1); a ringlike lip edge (3) is arranged around the rubber part (1); an air extraction chamber (4) communicated to the air hole (2) is formed on an inner side of the lip edge (3); a ringlike flanging (5) is arranged on the rubber part (1) on an outer side of the lip edge (3); and the flanging (5) is configured to be in buckled connection with the vacuum suction pad from the outside of the vacuum suction pad; a ringlike deformation slot (6) is provided in the middle of the lip edge (3), and the lip edge (3) below the deformation slot (6) forms a bent portion (7) configured to abut against a surface of an object by deformation after the vacuum suction pad extracts air;

a framework (9), wherein a grip (10) is arranged at a top of the framework (9); a mounting surface (11) is formed at a bottom of the framework (9); a periphery of the mounting surface (11) is connected to the rubber part (1) through a buckling element; an upper end of the rubber part (1) is wrapped around the buckling element via the flanging (5) and is buckled with the buckling element; and a lower end of the rubber part (1) extends to a position below the mounting surface (11) via the lip edge (3) and forms the air extraction chamber (4).

2. The vacuum suction pad with the replaceable rubber part according to claim 1, wherein the buckling element comprises a buckling plate (12) arranged at a peripheral edge of the framework (9); an overlap edge (13) is arranged on the framework (9) on an inner side of the buckling plate (12); the middle of the flanging (5) is in buckling connection to the buckling plate (12) through a buckling slot; and an inner side of the flanging (5) extends to an inner end of the buckling plate (12) and abuts against an outer wall of the overlap edge (13).

3. The vacuum suction pad with the replaceable rubber part according to claim 2, wherein a conical surface (131) with a narrow top and a wide bottom is formed at a position where the overlap edge (13) abuts against the flanging (5).

4. The vacuum suction pad with the replaceable rubber part according to claim 1, wherein an inner side of the grip (10) is detachably connected with an air pump (15) through a mounting hole (14); an air extraction and discharging channel (16) is provided in the grip (10) on one side of the mounting hole (14); one end of the air extraction and discharging channel (16) is communicated to the air pump (15); and the other end of the air extraction and discharging channel (16) is communicated to the air extraction chamber (4) after passing through the framework (9) and the air hole (2) in sequence.

5. The vacuum suction pad with the replaceable rubber part according to claim 4, wherein the air hole (2) is provided in a center of the rubber part (1); a first air passing slot (17) is provided in the mounting surface (11); a top of the first air passing slot (17) is communicated to the air extraction and discharging channel (16); one end of the first air passing slot (17) extends to an inner side of the air hole (2) and is communicated to the air extraction chamber (4); and the other end of the first air passing slot (17) extends to a position above the rubber part (1) on an outer side of the air hole (2).

6. The vacuum suction pad with the replaceable rubber part according to claim 5, wherein a dust cover (18) located on an inner side of the rubber part (1) is in buckling connection into the first air passing slot (17); and after being extracted, air in the air extraction chamber (4) passes through the dust cover (18) and enters the air extraction and discharging channel (6).

7. The vacuum suction pad with the replaceable rubber part according to claim 5, wherein a connection port configured to mount a negative pressure gauge (20) is provided in a top surface of the framework (9); a second air passing slot (21) is provided in a bottom surface of the framework (9); one end of the second air passing slot (21) extends inwards into an inner hole of the rubber part (1); and the other end of the second air passing slot (21) is communicated to the connection port.

8. The vacuum suction pad with the replaceable rubber part according to claim 5, wherein an exterior of the air pump (15) is connected to the mounting hole (14) through a positioning ring (19); the positioning ring (19) is configured to achieve concentric positioning on the mounting hole (14) and the air pump (15); and a sealing ring is connected between the positioning ring (19) and the mounting hole (14).

9. The vacuum suction pad with the replaceable rubber part according to claim 1, wherein the mounting surface (11) is circular or elliptical.

10. The vacuum suction pad with the replaceable rubber part according to claim 1, wherein the grip (10) comprises a crossbeam; vertical beams connected to the framework (9) are arranged at two ends of the crossbeam; the mounting hole (14) is provided in one end of the crossbeam; one end of the air pump (15) provided with the air hole is inserted into the mounting hole (14); one end of the air extraction and discharging channel (16) is located on a bottom surface of the mounting hole (14); and the other end of the air extraction and discharging channel (16) is communicated to the inner hole of the rubber part (1) after passing through one of the vertical beams.

* * * * *